(12) United States Patent
Jang

(10) Patent No.: US 8,251,040 B2
(45) Date of Patent: Aug. 28, 2012

(54) GASOLINE DIRECT INJECTION ENGINE

(75) Inventor: Pil Sung Jang, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 31 days.

(21) Appl. No.: 12/880,650

(22) Filed: Sep. 13, 2010

(65) Prior Publication Data

US 2011/0126798 A1   Jun. 2, 2011

(30) Foreign Application Priority Data

Dec. 2, 2009  (KR) ........................ 10-2009-0118738

(51) Int. Cl.
*F02F 3/26* (2006.01)
*F02F 3/14* (2006.01)
(52) U.S. Cl. ........................................ 123/276; 123/279
(58) Field of Classification Search .................. 123/276, 123/275, 279, 285, 298, 295, 305, 193.6
See application file for complete search history.

(56) References Cited

U.S. PATENT DOCUMENTS

| | | | | |
|---|---|---|---|---|
| 4,920,937 A | * | 5/1990 | Sasaki et al. | 123/305 |
| 6,378,486 B1 | * | 4/2002 | Spiegel et al. | 123/298 |
| 6,378,490 B1 | * | 4/2002 | Ottowitz et al. | 123/305 |
| 6,651,612 B2 | * | 11/2003 | Kobayashi | 123/298 |

FOREIGN PATENT DOCUMENTS

| | | |
|---|---|---|
| JP | 2005-90244 A | 4/2005 |
| KR | 10-2004-0041308 A | 5/2004 |

* cited by examiner

*Primary Examiner* — Mahmoud Gimie
(74) *Attorney, Agent, or Firm* — Morgan, Lewis & Bockius LLP

(57) ABSTRACT

A gasoline direct injection engine that has an injector directly injecting fuel into a combustion chamber, a spark plug, an intake valve, and an exhaust valve and generates power by reciprocating a piston in a cylinder, may include a first cavity formed on a piston head of the piston to return at least some flow of the fuel injected from the injector to the spark plug, a protrusion protruding and off-set from the first cavity toward the exhaust valve, and a second cavity formed from the protrusion to the exhaust valve at a smaller height than the first cavity.

15 Claims, 4 Drawing Sheets

GASOLINE DIRECT INJECTION ENGINE

CROSS-REFERENCE TO RELATED APPLICATION

The present application claims priority to Korean Patent Application No. 10-2009-0118738 filed in the Korean Intellectual Property Office on Dec. 2, 2009, the entire contents of which is incorporated herein for all purposes by this reference.

BACKGROUND OF THE INVENTION

1. Field of the Invention

The present invention relates to a structure of an engine. More particularly, the present invention relates to a structure of a gasoline direct injection engine having improved operational performance.

2. Description of Related Art

In general, a GDI (gasoline direct injection) technology has been developed to improve fuel efficiency and performance of an internal combustion engine. The GDI engine technology is to directly inject fuel into the combustion chamber, not into the intake manifold.

Since it is possible to directly inject fuel into the combustion chamber and produce a fuel-air mixture layer by using the GDI engine, it is possible to produce a condensed mixture by concentrate air and fuel around a spark plug. Accordingly, the engine can operate at a very small air/fuel ratio and wall wetting is reduced in comparison to injecting fuel to the intake port in the related art, such that it is possible to accurately control the amount of fuel and improve fuel efficiency and performance, and accordingly, the GDI engines are recently increasingly used.

Various methods of mixing air with fuel well and maximally concentrating an air-fuel mixture around the spark plug has been proposed to smoothly operate the engine at a small air/fuel ratio.

A vortex is generated in the axis perpendicular to the movement direction of the piston or with respect to the movement direction axis of the piston in the internal combustion engine, in which the former one is called 'tumble' and the later one is called 'swirl'.

Since the mixing ratio and concentration of the air and fuel depends on the flow level of the tumble and the swirl, design should be performed in consideration of the tumble and swirl to improve the operational performance of the GDI engine.

The tumble and swirl particularly depends on the shape of the top of the piston, the design of the top of the piston should be improved to improve the operational performance of the GDI engine.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a gasoline direct injection engine having advantages of easily controlling the volume ratio with respect to spark plugs at an exhaust valve and an intake valve of a combustion chamber.

In an aspect of the present invention, the gasoline direct injection engine that has an injector directly injecting fuel into a combustion chamber, a spark plug, an intake valve, and an exhaust valve and generates power by reciprocating a piston in a cylinder, may include a first cavity formed on a piston head of the piston to return at least some flow of the fuel injected from the injector to the spark plug, a protrusion protruding and off-set from the first cavity toward the exhaust valve, and a second cavity formed from the protrusion to the exhaust valve at a smaller height than the first cavity.

The first cavity may be formed in a circular shape or an elliptical shape and off-set at a predetermined distance vertically downward from the spark plug to the intake valve.

The center of the first cavity may be offset from a center line of the piston toward the intake valve.

A top portion of the first cavity may be a flat surface perpendicular to the piston.

The top portion of the first cavity may be flat in a flow direction of the fuel injected from the injector.

The spark plug may be disposed toward the combustion chamber.

A top portion of the protrusion may protrude in an arc shape with respect to the center of the first cavity to surround the first cavity, wherein the second cavity is dented around the protrusion, and wherein distal end portions of the second cavity are merged to the first cavity to form a junction portion therebetween.

According to a gasoline direct injection engine according the present invention, since the first cavity positioned to the intake valve and the second cavity positioned to the exhaust valve are different in height, as described above, it is easy to control the volume ratio of the intake valve and the exhaust valve with respect to the spark plug, such that it is possible to change the volume ratio of the combustion chamber.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
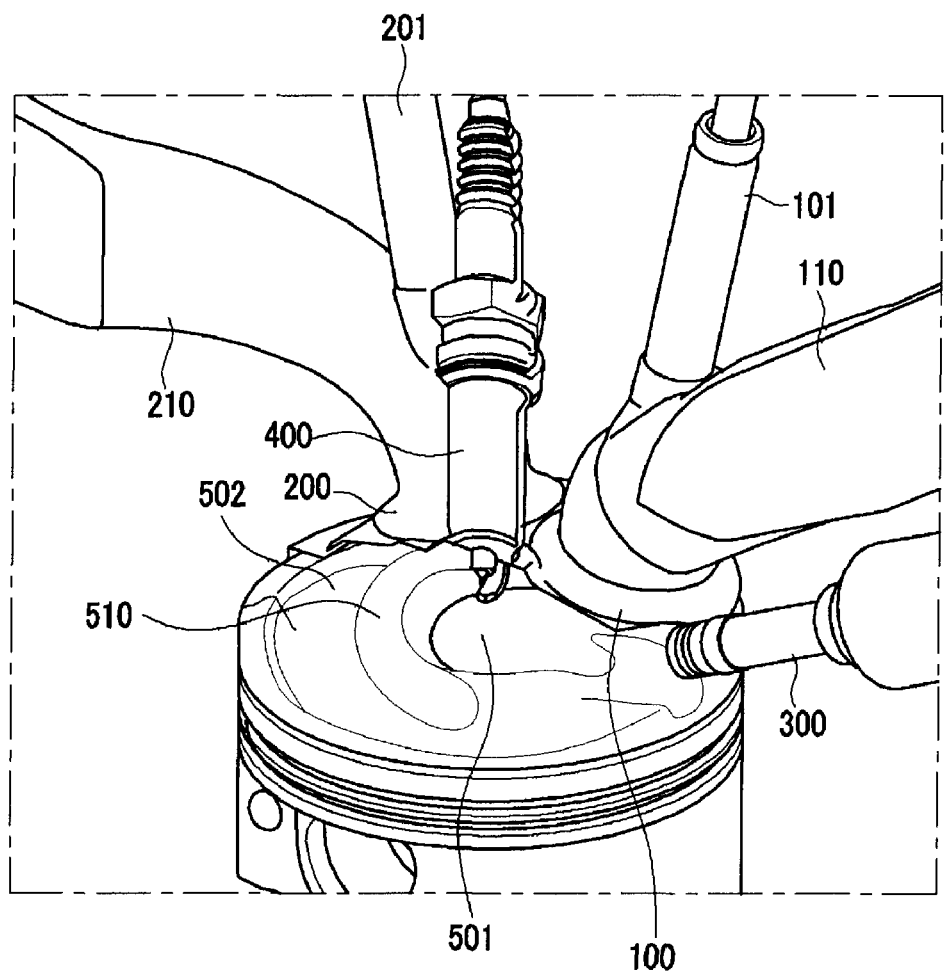
FIG. 1 is a perspective view of a gasoline direct injection engine according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

FIG. 1 is a perspective view of a gasoline direct injection engine according to an exemplary embodiment of the present invention.

Figure 2:
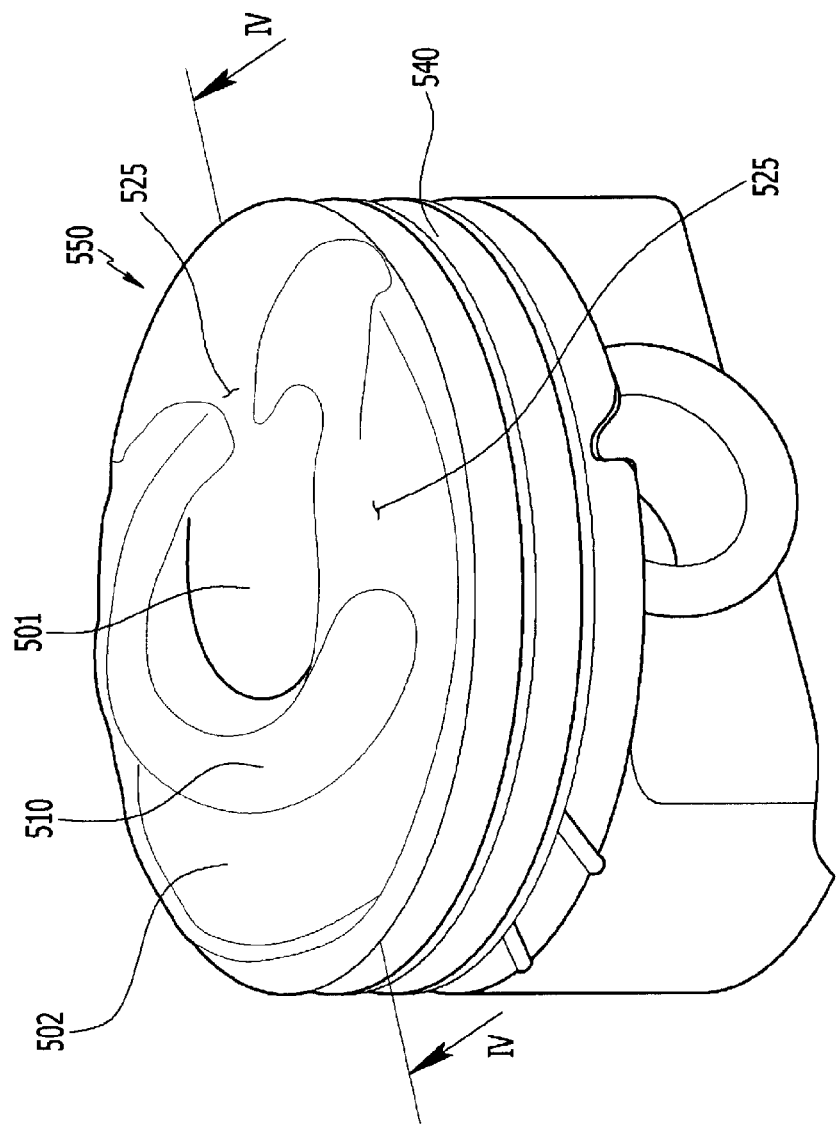
FIG. 2 is a perspective view of a piston head applied to a gasoline direct injection engine according to an exemplary embodiment of the present invention.

FIG. 2 is a perspective view of a piston head applied to a gasoline direct injection engine according to an exemplary embodiment of the present invention.

Figure 3:
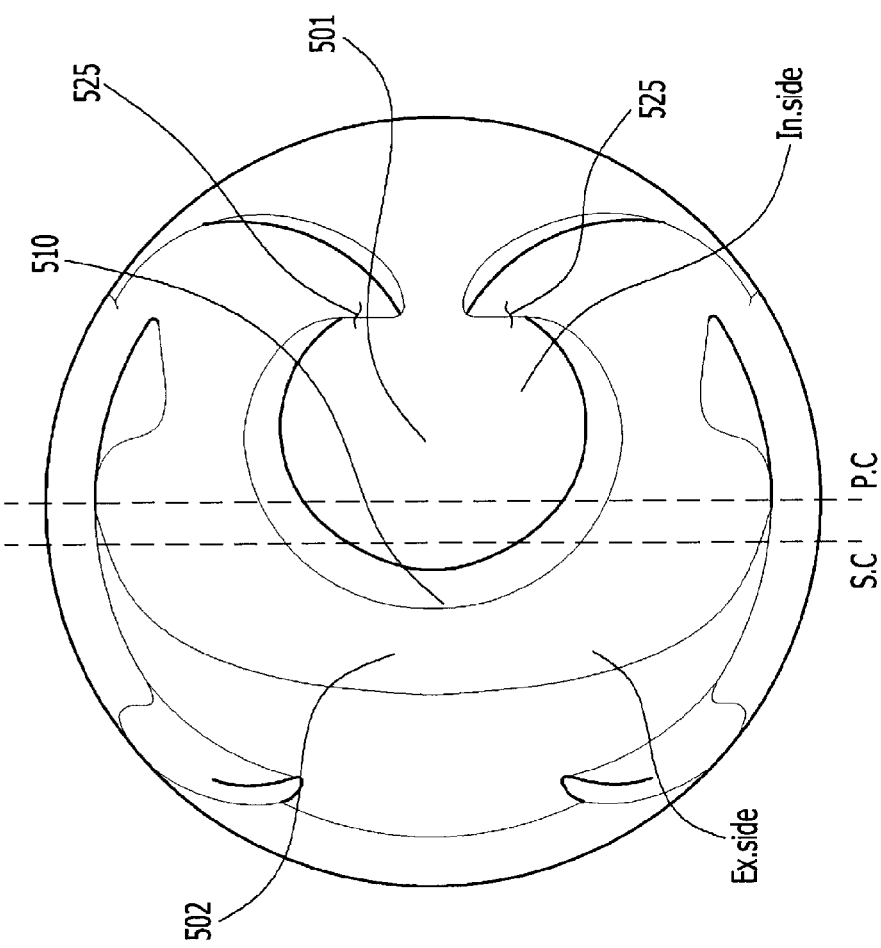
FIG. 3 is a top plan view of FIG. 2.

FIG. 3 is a top plan view of FIG. 2.

Figure 4:
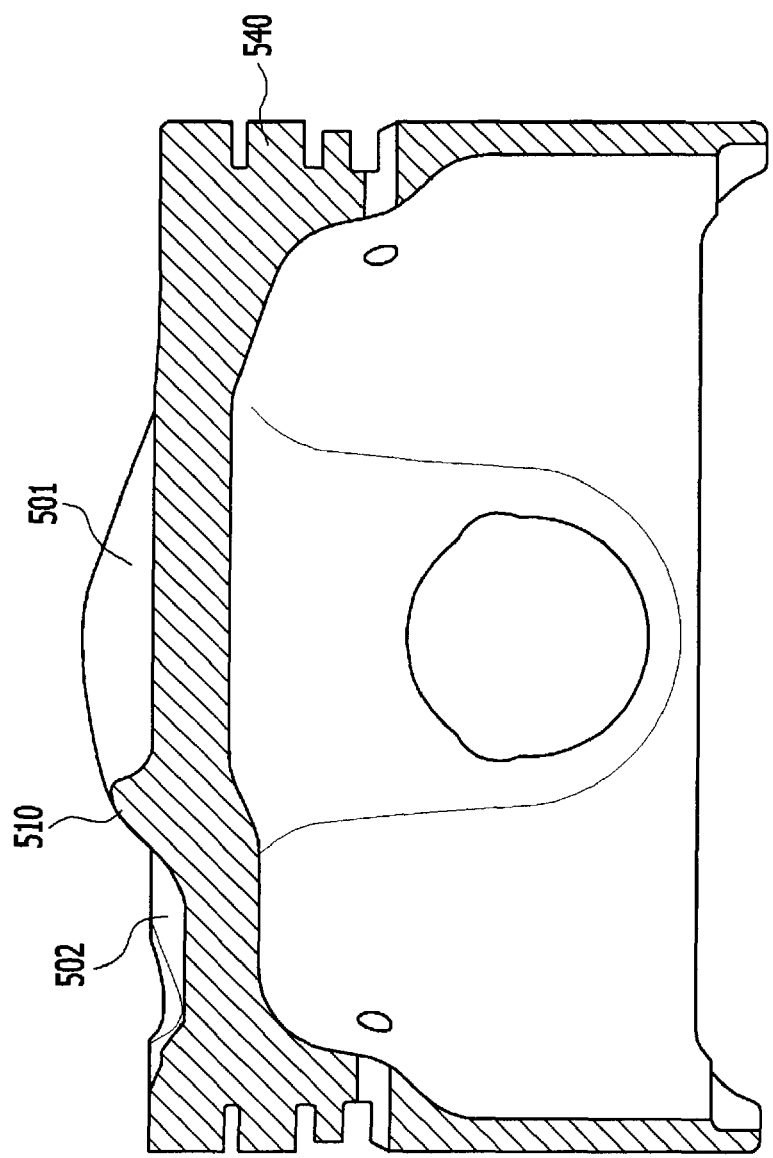
FIG. 4 is a cross-sectional view taken along line IV-IV of FIG. 2.

FIG. 4 is a cross-sectional view taken along line IV-IV of FIG. 2.

A gasoline direct injection engine according to an exemplary embodiment of the present invention, as shown in FIGS. 1 to 4, includes a combustion chamber, at least a pair of intake ports 100, an intake valve 101 positioned at the inlet of the combustion chamber in the downstream of the intake port 100, a piston 550, a first cavity 501 and a second cavity 502 formed at the intake side on the piston 550, an injector directly inject fuel from the side of the cylinder into each combustion chamber, a spark plug, an electronic control unit (hereafter, referred to as ECU) performing combustion control, at least a pair of exhaust port 200, and a exhaust valve 201 positioned at the outlet of the combustion chamber in the upstream of the exhaust port 200.

In this configuration, the intake and exhaust valves 101 and 201 and the intake and exhaust ports 100 and 200 are two, respectively, in the drawings, but only one is shown in the present embodiment for the convenience of description.

Further, in FIG. 3, reference numeral 'SC' indicates the center line of the spark plug 400, reference numeral 'PC' indicates the center line of the piston 550, reference numeral 'Ex. side' indicates the exhaust valve 201 side, and reference numeral 'In. side' indicates the intake valve 101 side.

Further, the combustion chamber means the space between the first cavity 501 and the spark plug 400.

The injector 300 is formed toward the combustion chamber and the first cavity 501 depressed on the top of the piston 550 is formed with respect to the injection direction of the injector 300.

The intake port 100 is connected to the intake pipe 110 and the exhaust port 200 is connected to the exhaust pipe 210.

The intake valve 101 opening/closing the intake port 100 and the exhaust valve 201 opening/closing the exhaust port 200 are disposed above the cylinder head of the engine, and at an upper side of the combustion chamber.

The intake valve 101 and the exhaust valve 201, for example, are opened/closed by a valve driving mechanism.

Meanwhile, the engine has the spark plugs 400 and the injectors 300 corresponding to the number of the cylinders, and at least a pair of the spark plugs 400 and the injectors 300 may be provided to the combustion chamber, respectively.

The spark plug 400 is mounted to the cylinder head to be positioned at the center portion of the upper portion of the corresponding combustion chamber.

Further, in the present embodiment, a side injection type is used and the injector 300 is mounted to the cylinder head to be positioned at the downstream of the intake pipe 110 extending to the combustion chamber.

That is, the injector 300 directly injects fuel from the side to the corresponding combustion chamber.

Meanwhile, the first cavity 501 is formed on the piston head 540, that is, the top of the piston 550 to produce desired gas mixture layer around the spark plug 400.

The first cavity 501 has a substantially circular or elliptical shape and it is preferable that the center is biased at a predetermined distance from the center of the combustion chamber to the intake port 100.

With this configuration, the gas mixture flowing inside from the intake port 100 is returned by the first cavity 501 formed substantially adjacent to the intake port.

That is, the first cavity 501 is biased to the intake valve 101, flat in the flow direction of the fuel injected from the injector 300 and flowing from the intake side to the exhaust side, that is, in the perpendicular direction to the longitudinal direction of the piston 550, and gradually curved upward at the end portion.

Further, the inclination of the bottom, the side, and the rear side of the first cavity 501 is determined such that at least some of the fuel injected from the injector 300 returns to the intake valve 101.

A stratified combustion operation can be performed by the flow along the shape of the first cavity 501.

Further, a protrusion 510 extending to the front (to the exhaust valve) of the first cavity 501 is formed.

The protrusion 510 protrudes to separate the first cavity 501 from the second cavity 502, which is described below.

Further, the protrusion 510 is biased to the exhaust valve 201 from the center of the first cavity 501 at a predetermined distance from the first cavity 501 while having an arc shape in a plan.

That is, the second cavity 502 is positioned to the exhaust valve 201 from the center of the protrusion 510.

In this configuration, the second cavity 502 is lower than the first cavity 501.

Since the first cavity 501 positioned to the intake valve 101 and the second cavity 502 positioned to the exhaust valve 201 are different in height, as described above, it is easy to control the volume of the intake valve 101 and the volume of the exhaust valve 201, such that it is possible to change the volume ratio of the combustion chamber.

In an exemplary embodiment of the present invention, distal end portions of the second cavity 502 may be merged to the first cavity 501 to form a junction portion 525 therebetween.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof.

It is intended that the scope of the invention be defined by the Claims appended hereto and their equivalents.

What is claimed is:

1. A gasoline direct injection engine that has an injector directly injecting fuel into a combustion chamber, a spark plug, an intake valve, and an exhaust valve and generates power by reciprocating a piston in a cylinder, the gasoline direct injection engine, comprising
    a first cavity formed on a piston head of the piston to return at least some flow of the fuel injected from the injector to the spark plug;
    a protrusion protruding and off-set from the first cavity toward the exhaust valve; and
    a second cavity formed from the protrusion to the exhaust valve, wherein the second cavity is disposed lower than the first cavity, the second cavity surrounding the protrusion in an arc shape;
    wherein distal end portions of the second cavity are merged to the first cavity to form a junction portion therebetween.

2. The gasoline direct injection engine of claim 1, wherein the first cavity is formed in a circular shape or an elliptical shape and off-set at a predetermined distance vertically downward from the spark plug to the intake valve.

3. The gasoline direct injection engine of claim 2, wherein the center of the first cavity is offset from a center line of the piston toward the intake valve.

4. The gasoline direct injection engine of claim 2, wherein a top portion of the first cavity is a flat surface perpendicular to the piston.

5. The gasoline direct injection engine of claim 2, wherein a top portion of the first cavity is flat in a flow direction of the fuel injected from the injector.

6. The gasoline direct injection engine of claim 1, wherein the spark plug is disposed toward the combustion chamber.

7. The gasoline direct injection engine of claim 1, wherein a top portion of the protrusion protrudes in an arc shape with respect to the center of the first cavity to surround the first cavity.

8. The gasoline direct injection engine of claim 7, wherein the second cavity is dented around the protrusion.

9. A gasoline direct injection engine that has an injector directly injecting fuel into a combustion chamber, a spark plug, an intake valve, and an exhaust valve and generates power by reciprocating a piston in a cylinder, the gasoline direct injection engine, comprising:
    a first cavity formed on a piston head of the piston to return at least some flow of the fuel injected from the injector to the intake valve;
    a protrusion off-set from the first cavity to the exhaust valve and having a top portion protruding in an arc shape surrounding the first cavity; and
    a second cavity formed from the protrusion to the exhaust valve, wherein the second cavity is disposed lower than the first cavity, the second cavity surrounding the protrusion in an arc shape;
    wherein distal end portions of the second cavity are merged to the first cavity to form a junction portion therebetween.

10. The gasoline direct injection engine of claim 9, wherein the first cavity is formed in a circular shape or an elliptical shape and off-set at a predetermined distance vertically downward from the spark plug to the intake valve.

11. The gasoline direct injection engine of claim 10, wherein the center of the first cavity is offset from a center line of the piston toward the intake valve.

12. The gasoline direct injection engine of claim 9, wherein a top portion of the first cavity is a flat surface perpendicular to the piston.

13. The gasoline direct injection engine of claim 9, wherein the top portion of the first cavity is flat in a flow direction of the fuel injected from the injector.

14. The gasoline direct injection engine of claim 9, wherein the spark plug is disposed toward the combustion chamber.

15. The gasoline direct injection engine of claim 9, wherein the second cavity is dented around the protrusion.

\* \* \* \* \*